United States Patent
Clarke et al.

(10) Patent No.: US 9,623,372 B2
(45) Date of Patent: Apr. 18, 2017

(54) PROCESSING OF OFF-GAS FROM WASTE TREATMENT

(71) Applicant: Pyropure Limited, Bordon (GB)

(72) Inventors: Howard Morgan Clarke, Petersfield (GB); Peter Bartl, Bordon (GB)

(73) Assignee: Pyropure Limited, Hampshire (GB)

( * ) Notice: Subject to any disclaimer, the term of this patent is extended or adjusted under 35 U.S.C. 154(b) by 0 days.

(21) Appl. No.: 14/842,431

(22) Filed: Sep. 1, 2015

(65) Prior Publication Data

US 2016/0045865 A1 Feb. 18, 2016

Related U.S. Application Data

(63) Continuation of application No. 13/141,187, filed as application No. PCT/GB2009/002939 on Dec. 22, 2009, now abandoned.

(30) Foreign Application Priority Data

Dec. 22, 2008 (GB) .................................... 0823362.9

(51) Int. Cl.
*B01D 53/86* (2006.01)
*F23C 13/08* (2006.01)
(Continued)

(52) U.S. Cl.
CPC ....... *B01D 53/8656* (2013.01); *B01D 53/864* (2013.01); *B01D 53/8696* (2013.01);
(Continued)

(58) Field of Classification Search
None
See application file for complete search history.

(56) References Cited

U.S. PATENT DOCUMENTS 3,068,812 A * 12/1962 Hemeon .................. F23G 5/10
110/190
4,954,694 A * 9/1990 Nagai ..................... F24C 14/02
219/393
(Continued)

FOREIGN PATENT DOCUMENTS

DE 43 39 157 5/1995
DE 19608093 * 9/1997
(Continued)

OTHER PUBLICATIONS

Search Report for patent application No. GB 0823362.9 dated Apr. 8, 2009, from the Great Britain Intellectual Property Office.
(Continued)

*Primary Examiner* — Melvin C Mayes
*Assistant Examiner* — Sheng H Davis
(74) *Attorney, Agent, or Firm* — Finnegan, Henderson, Farabow, Garrett & Dunner, LLP

(57) ABSTRACT

Waste treatment comprises heating it in a chamber to effect pyrolysis of the waste, introducing oxygen into the chamber to effect combustion of the pyrolyzed waste, and contacting off-gas from the pyrolysis and/or combustion steps with an oxidation catalyst to convert carbon monoxide and hydrocarbons in the off-gas into carbon dioxide and water and with a reduction catalyst to convert nitrous oxides to nitrogen and oxygen. Thus, domestic waste is treated in a batch process using catalytic converters to reduce the level of toxic components before off-gas reaches the atmosphere.

23 Claims, 6 Drawing Sheets

(51) Int. Cl.
*F23G 5/027* (2006.01)
*F23G 5/16* (2006.01)
*F23G 7/07* (2006.01)
*F23G 5/00* (2006.01)

(52) U.S. Cl.
CPC ............... *F23C 13/08* (2013.01); *F23G 5/00* (2013.01); *F23G 5/027* (2013.01); *F23G 5/0276* (2013.01); *F23G 5/165* (2013.01); *F23G 7/07* (2013.01); *B01D 2255/102* (2013.01); *B01D 2255/1021* (2013.01); *B01D 2255/1023* (2013.01); *B01D 2255/1025* (2013.01); *F23G 2200/00* (2013.01); *F23J 2217/10* (2013.01); *F23J 2219/10* (2013.01); *F23J 2219/40* (2013.01); *Y02C 20/10* (2013.01)

(56) References Cited

U.S. PATENT DOCUMENTS

| | | | |
|---|---|---|---|
| 5,055,278 A * | 10/1991 | Reidick | B01D 53/8656 423/235 |
| 5,147,415 A * | 9/1992 | Herbert | B01D 53/58 48/197 R |
| 5,232,890 A | 8/1993 | Ganguli et al. | |
| 5,500,194 A | 3/1996 | Bell | |
| 5,626,088 A * | 5/1997 | Hiltunen | C10J 3/54 110/243 |
| 5,826,520 A | 10/1998 | Mainord | |
| 5,960,722 A * | 10/1999 | Kiss | C10J 3/08 110/218 |
| 6,413,484 B1 | 7/2002 | Koch | |
| 2007/0110643 A1 | 5/2007 | Sobolevskiy et al. | |
| 2008/0089822 A1 | 4/2008 | Frey et al. | |

FOREIGN PATENT DOCUMENTS

| | | | |
|---|---|---|---|
| EP | 0 350 706 | | 1/1990 |
| EP | 0 486 728 | | 11/1990 |
| EP | 0 522 231 | | 1/1993 |
| EP | 1 108 460 | | 6/2001 |
| EP | 1 134 018 | | 9/2001 |
| EP | 1207190 | * | 5/2002 |
| EP | 1 518 613 | | 3/2005 |
| EP | 1 820 946 | | 8/2007 |
| EP | 2 131 107 | | 12/2009 |
| JP | 63-49216 | | 3/1988 |
| JP | 3-195809 | | 8/1991 |
| JP | 2008-267767 | | 11/2008 |
| KR | 200736444 | | 4/2007 |
| WO | WO 2005/066542 | | 7/2005 |
| WO | WO 2007/104954 | | 9/2007 |

OTHER PUBLICATIONS

International Search Report and Written Opinion for PCT/GB2009/002939 mailed Feb. 15, 2011, from the European Patent Office.
Written Opinion of the International Preliminary Examining Authority for International Application No. PCT/GB2009/002939. dated Aug. 23, 2011, from the European Patent Office.

* cited by examiner

PROCESSING OF OFF-GAS FROM WASTE TREATMENT

This is a continuation of U.S. patent application Ser. No. 13/141,187, filed on Sep. 7, 2011, now abandoned, which is a U.S. National Phase application of PCT/GB2009/002939, filed on Dec. 22, 2009, which claims the benefit of priority under 35 U.S.C. §119 to GB 0823362.9, filed on Dec. 22, 2008, all of which are incorporated herein by reference in their entireties.

The present invention relates to method and apparatus for processing of off-gas from waste treatment.

A number of approaches are known for destructive treatment of waste, including incineration, pyrolysis, combustion (gasification) and combinations of such methods.

A problem with waste treatment, in particular domestic waste, is that no two waste loads are identical, due to the number of variables that exist in its composition, including weight, volume and water content. This is generally true even for single waste streams such as incontinence waste.

Regulations governing the waste treatment industry set maximum levels for certain components of the output of the treatment. The reality is hence that any waste disposal system has to deal with uncontrolled inputs but then produce controlled outputs of non hazardous emissions.

A typical waste load being treated by a combination of pyrolysis and combustion in accordance with the processes described in WO2007/104954, whether mixed or single stream, will produce carbon monoxide (CO), hydrogen ($H_2$), various hydrocarbons (including volatile organic compounds, also referred to as VOCs or as $C_xH_yO_z$, and tar, being a mixture of organic compounds produced by pyrolysis of organic matter in waste), water ($H_2O$), oxides of sulphur ($SO_x$), oxides of nitrogen (also referred to as nitrous oxides, $NO_x$), hydrogen chloride (HCl), hydrogen fluoride (HF) and various volatile metals.

It is desired to carry out such processes as close as possible to the location of the waste, avoiding waste transport over large distances, but to achieve this whilst remaining within the regulations governing off-gas content requires strict compliance with maximum levels for certain off-gas components. It is also desired to provide methods and apparatus suitable for domestic scale use.

The pyrolysis and combustion methods known may produce high levels of carbon monoxide and also hydrocarbons such as VOCs and/or tars. It is known to reduce such emissions in large-scale pyrolysis plants by the introduction of a secondary combustion step. This, however, generates temperatures which would, be excessive in a domestic unit and can also generate other unwanted off-gas components.

It is an object of the invention to ameliorate the above-identified problems. An object of particular embodiments of the invention is to provide a process and apparatus to treat waste on site on a domestic and large domestic scale with reduction in carbon monoxide and hydrocarbon levels in off-gas. It is an object of specific embodiments of the invention to do so for multi-occupancy residences and also individual domestic residences and commercial enterprises such as supermarkets, restaurants, care homes and hospitals. A further object is to reduce and/or remove the need for the transport of waste and prevent waste ending up as landfill, allowing local authorities to meet the requirements of recycling directives.

Accordingly, the invention provides a method for treatment of waste, comprising heating waste in a chamber to effect pyrolysis of the waste; introducing oxygen into the chamber to effect combustion of the waste; and contacting off-gas from the pyrolysis and/or combustion steps with an oxidation catalyst to convert carbon monoxide and hydrocarbons in the off-gas into carbon dioxide and water.

In the present invention, "combustion" includes any oxidation reaction of carbon-based materials where the oxidant is oxygen and where the reaction is energy-neutral or at least slightly exothermic. That includes gasification, which is the precise term for the oxidation reaction occurring in the chamber in the present invention since that oxidation tends to be slightly exothermic and the main product is carbon monoxide rather than carbon dioxide.

Hence, in typical embodiments of the invention, waste is heated to carry out pyrolysis of the waste in the chamber. In a subsequent step, which generally occurs directly afterwards, but which can be time separated from the pyrolysis, sufficient oxygen is input into the same chamber to effect gasification in that chamber of the pyrolyzed waste. Thus pyrolysis and gasification are carried out in sequence in the same chamber. Preferably, input of oxygen is sufficient for gasification but insufficient to allow ignition of the waste. As a result gasification proceeds without ignition and without a flame in the chamber.

Methods and apparatus of the invention are particularly suited for treatment of waste selected from domestic waste, food-containing waste, carbonaceous waste, waste produced by flats, houses and single- and multi-occupancy residential buildings, restaurant waste, supermarket waste, hospital waste, waste from health care service including nursing homes, sewage treatment waste and sanitary waste, especially domestic waste, food-containing waste, waste produced by multi-occupancy residential buildings.

The invention also provides apparatus incorporating a catalyst, e.g. an oxidation catalyst and/or a catalytic converter, to reduce the off-gas content of CO and hydrocarbons such as VOCs and tar.

The oxidation catalyst is suitably operated at a temperature of from 200° C. to 900° C., especially at a temperature of from 300° C. to 800° C. Oxidation catalysts for use in the invention may comprise platinum or palladium and occasionally though less commonly rhodium. In particular embodiments, the oxidation catalyst is a diesel particulate filter or a 2-way catalytic converter or comprises palladium on alumina. Specific embodiments employ one or more catalytic converters of the type used in the automobile industry, which have been found in use to be effective at significantly reducing the hydrocarbon and CO content of the off-gas. Oxidation catalysts containing palladium and alumina or containing platinum and iridium can be used in the invention.

Methods of the invention may comprise contacting off-gas with a first oxidation catalyst which is a diesel particulate filter and a second catalyst which is a 2-way catalytic converter, or may comprise contacting off-gas with a first oxidation catalyst which is a diesel particulate filter and a second catalyst which comprises palladium and alumina.

Methods of the invention may also comprise filtering off-gas to remove ash prior to contact of off-gas with the oxidation and/or reduction catalysts, preferably filtering off-gas so that ash remains in the chamber. Particularly preferred embodiments comprise filtering the off-gas to remove ash and using an oxidation catalyst comprising palladium on alumina. In alternative embodiments of the invention a cyclone may be used to collect ash prior to contact of off-gas with the oxidation and/or reduction catalysts so that the ash can be later removed separately or dropped into an existing chamber drain pipe.

In further embodiments of the invention, the method further comprises contacting off-gases with a reduction catalyst to remove nitrous oxides, typically by conversion into nitrogen and oxygen. "Nitrous oxides" as used herein refers to any nitrogen oxide, and includes those compounds commonly known as $NO_x$. The order of the catalytic surfaces can be that the off-gas passes first through the oxidation catalyst then the reduction catalyst or that the off-gas passes first through the reduction catalyst then the oxidation catalyst. Reduction catalysts for use in the invention may comprise rhodium and also though less commonly palladium and/or platinum. The reduction catalysts may comprise rhodium and platinum, rhodium and palladium or all three of rhodium, palladium and platinum.

The reduction catalyst is suitably operated at a temperature of 300° C.-700° C., especially at a temperature of from 400° C.-600° C. The reduction catalyst may be a 3-way catalytic converter e.g. from the automobile industry.

A reduction catalyst may be used if the nitrous oxide content of the off-gas is known to be or is expected to be above a certain level, e.g. a level at which emission regulations would be breached. A reduction catalyst may also be used if another process in the off-gas treatment, in removing one undesirable component, introduces nitrous oxides as a by-product.

A catalyst may be used which combines, in a single unit, both reduction catalyst surfaces and oxidation catalyst surfaces or a surface which can provide both oxidation and reduction dependent upon the nature of the gas.

Hence, the invention provides apparatus incorporating one or more catalytic converters to reduce the off-gas content of CO and hydrocarbons such as VOCs and tar, and also its content of nitrous oxides.

In particularly preferred embodiments, the method comprises contacting the off-gas with an oxidation catalyst and subsequently contacting the off-gas with a reduction catalyst. In a specific embodiment described in the examples, the method comprises contacting the off-gas with, in sequence, an oxidation catalyst, a reduction catalyst and a second oxidation catalyst. An additional preferred embodiment of the invention comprises contacting the off-gas with a single oxidation catalyst. Other off-gas treatment units described herein may be located between the catalysts, and the above refers to the respective catalyst positions in the off-gas flow.

As an optional step, the method may include contacting the off-gas with one or more or all of (i) a wet scrubber to remove inorganic acids and volatile metals, (ii) a so-called VTT unit, being a VOC thermal treatment unit which destroys volatile organic compounds and heavy tars but can produce thermal $NO_x$, (iii) a dry filtration unit, a mist eliminator, which prevents carry over of water vapour into subsequent processing stages, and (iv) a filter which eliminates particulates. This latter filter can be omitted if the off-gas passes finally into a water course such as the sewer, as the water will also remove particulates. The wet scrubber can also provide sufficient filtration of particulates that no other such filter is needed.

The invention additionally provides waste treatment apparatus, for carrying out the methods of the invention, comprising a chamber to receive waste; a heater to heat waste in the chamber; an outlet for exit of off-gas from the chamber; and an oxidation catalyst to catalyse oxidation of carbon monoxide and hydrocarbons in the off-gas.

The chamber is preferably adapted to be sealed so that waste can be heated in the absence of oxygen to effect pyrolysis of the waste, generally an initial stage of waste treatment. The chamber also preferably comprises an inlet for air to enable oxygen as a component of air to enter the chamber to effect combustion of the waste. By reference herein to absence of oxygen, in order to effect pyrolysis, it is intended to refer to an amount of oxygen that is insufficient for combustion or oxidation to take place to any significant extent, the reactions in the chamber thus being largely pyrolysis. Thus during the pyrolysis phase there can be some introduction of air, for example to help flush off-gas into the exhaust. Air can be supplied to the chamber by means of an air compressor optionally connected to an air tank. This additionally allows pressurised air to be injected into the chamber to stir up waste thus ensuring that the full load of waste in the chamber is evenly heated.

Air being supplied to the chamber may pass through a heat exchanger that receives the exhaust from the catalytic converter. The heat exchanger transfers heat from gases exiting the catalyst onto the air being supplied to the chamber, thus reducing the amount of energy required to heat the chamber.

The oxidation catalyst may be a diesel particulate filter, a 2-way catalytic converter or may comprise palladium and alumina. The apparatus may also comprise a first oxidation catalyst which is a diesel particulate filter and a second catalyst which is a 2-way catalytic converter, or a first oxidation catalyst which is a diesel particulate filter and a second catalyst which comprises palladium and alumina.

The apparatus may further comprises a reduction catalyst to catalyse reduction of nitrous oxides in the off-gas and, if the reduction catalyst is present, it is preferred that the apparatus has, in sequence, an oxidation catalyst for treatment of off-gas exiting the chamber and a reduction catalyst for treatment of off-gas exiting the oxidation catalyst. The apparatus may also comprise a filter to prevent ash exiting the chamber in the off-gas. Alternatively a cyclone may be used to collect the ash from the off-gas exiting the chamber, prior to the off-gas entering the catalyst.

In more detail, the invention provides a process for waste treatment comprising introducing waste into a chamber, heating the waste to an elevated temperature to effect pyrolysis of the waste, introducing oxygen into the chamber to effect combustion of the waste and treating off-gas exiting the chamber by contact with one or more oxidation catalysts, and optionally further with one or more reduction catalysts of the invention. The method optionally comprises flushing the combusted waste from the chamber with water. The solid residue of the treated waste is mostly fine ash and is easily washed away into e.g. a sewer or other water course. Waste is thus treated on site. Optionally, injections of pressurised air may be used to assist in dislodging solid residue from the chamber.

The invention may employ 2-way and/or 3-way catalysts. 2 way catalysts are generally oxidation only catalysts and convert (oxidize) carbon monoxide and hydrocarbons into carbon dioxide and water. 3 way catalysts can also convert nitrous oxides to nitrogen, thus they can convert carbon monoxide, hydrocarbons and nitrous oxides into carbon dioxide, nitrogen and water vapour, by a combination of oxidation and reduction according e.g. to the nature of the gas being converted, whether it is relatively lean or rich and/or its oxygen content.

Optionally, a solution such as urea can be added to the off-gases of the waste treatment process to decrease levels of nitrogen oxides in the off-gases. Typically, the solution is supplied by injection into or near the catalyst. A urea solution generates ammonia which reacts with the nitrogen oxides to reduce them to nitrogen and oxygen in the presence of a SCR (selective catalytic reduction) catalyst.

A further option to reduce the NOx emissions is to add oxidizing chemical compounds to the scrubber water, so that the NO fraction in the NOx emissions is oxidized to $NO_2$, which can be more easily absorbed by the water scrubber, thereby increasing the overall fraction of NOx removed from the off-gas by the water scrubber. Such oxidizing compounds include, among others, sodium hypochlorite, calcium hypochlorite, oxychlorine compounds generally (ClOx), hydrogen peroxide, potassium permanganate, sodium sulfite, and Fe-EDTA.

In an embodiment of the invention, the oxidation catalyst is a so-called two-way catalytic converter and catalyzes two reactions, namely oxidation of carbon monoxide to carbon dioxide (e.g. $2CO+O2 \rightarrow 2CO2$) and oxidation of hydrocarbons to carbon dioxide and water (e.g. $CxH4x+2xO2 \rightarrow xCO2+2xH2O$).

In another embodiment of the invention, the oxidation catalyst is a so-called three-way catalytic converter and catalyzes three reactions, namely reduction of nitrogen oxides to nitrogen and oxygen (e.g. $2NOx \rightarrow xO2+N2$), oxidation of carbon monoxide to carbon dioxide (e.g. $2CO+O_2 \rightarrow 2CO_2$) and oxidation of hydrocarbons (HC) to carbon dioxide and water (e.g. $C_xH_{2x+2}2xO_2 \rightarrow xCO_2+2_xH_2O$).

In a further embodiment of the invention, the apparatus comprises both a two-way catalytic converter and a three-way catalytic converter, the off-gas passing preferably first through the two-way catalytic converter.

The oxidation catalyst may be a so-called diesel particular filter-type catalyst (DPF catalyst). These are thermally robust and can be used especially to remove tar from the off-gas as tar removal is exothermic and the DPF filters can tolerate the temperatures generated. One such catalyst is obtained from European Exhaust & Catalysts Ltd, UK, containing 3 substrates of dimensions approximately 14.2 cm×3 cm (5.66 inches×1.2 inches), porosity of 200 ppi (pores per inch) within a steel can. The substrates are coated with catalytic washcoat with a precious metal loading of 15 g/ft$^3$ of palladium and the catalyst has a preferred operating temperature within the 700-800° C., more preferably about 750° C. This catalyst can remove hydrocarbons such as tars and carbon monoxide from the off-gas.

Another suitable oxidation catalyst is an automobile catalyst from European Exhaust & Catalysts Ltd (EEC) containing 2 substrates approximately 11.7 cm×7.5 cm (4.66 inches×3 inches)×400 cpsi (cells per square inch) in a steel can, with a catalytic loading of 35 g/ft$^3$ platinum. The catalyst has a preferred operating temperature within the range 200-800° C., more preferably about 300-500° C.

The oxidation catalyst may be of the type exemplified by catalyst CK-304 from Haldor-Topsoe (the HT). These catalysts comprise palladium on alumina, generally as palladium impregnated on alumina, such as on spheres of 3-5 mm diameter with a preferred operating temperature in the range 500-600° C. These catalysts are useful in removing VOCs, including methane and ethane. Light alkanes such as methane and ethane are generally removed well by these catalysts. They are less tolerant of high temperatures, so can be used alone or in combination with a DPF which removes exothermic tars so that the HT can then remove remaining VOCs, especially methane. These catalysts can also be operated at lower temperatures, e.g. 350-500° C., such as when destruction of methane is of lower importance or during a portion of the waste treatment cycle when methane production is reduced.

Typically, the reactions taking place in the catalyst are exothermic and it is thus possible for a catalyst to overheat in use. In an embodiment of the invention a temperature sensor can be included in or near the catalyst so that an increase in temperature above a predetermined level, or above a predetermined level for a predetermined amount of time triggers an increase in air input to the catalyst to reduce the temperature. In particular embodiments of the invention the catalyst operates at about 600° C. and will tolerate brief periods of operation at about 700° C., however, long term temperatures of above about 700° C. can be damaging. The temperature tolerances and relevant thresholds will vary according to the specific type of catalyst being used, with the optimum operating temperature often being dictated by the desired composition of the off-gases exiting the catalyst. Generally higher operating temperatures, e.g. about 700° C. or over, result in up to 100% of VOCs being removed by the catalyst. If it is acceptable for certain products, such as methane, to be present in the off-gas exiting the apparatus then the operating temperature of the catalyst can be reduced, however, if the temperature is too low, e.g. below about 300° C. then a significant number of VOCs may not be removed by the catalyst.

The invention can comprise an oxygen sensor to measure the oxygen content of the exhaust gas from the catalyst and this information can be used to modulate the amount of air input to the catalyst or input to the chamber or both. Typically if the oxygen content falls below a predetermined level then the amount of air input is increased until the oxygen level in the output gases reaches an acceptable threshold. Similarly, if the amount of oxygen is above a certain level then the amount of air input is reduced. Generally in the present invention reference to oxygen input is achieved by air input.

If there is too little oxygen present in the off-gases entering the catalytic converter there is a risk, for instance, that $H_2S$, with its characteristic smell, may not be sufficiently converted to SOx and so not captured by a water scrubber, resulting in $H_2S$ being released from the apparatus.

Generally, in operation of the invention the oxygen level of gas exiting the apparatus is maintained within the 1-16% range, preferably in the 3-10% range. A safe oxygen level is typically at least 4%, preferably 5 to 6%. If oxygen rises to about 16% or above then air input will generally be reduced, either by reducing air input to the chamber or by reducing air input prior to the catalyst or both.

An oxygen sensor may be provided by a "Lambda" sensor, such as used in the automobile industry. Lambda sensors can be poisoned by sulphur and are thus generally located downstream from the scrubber (which removes sulphur from the off-gas stream). Alternative oxygen sensors that are not poisoned by sulphur can be used and in this embodiment of the invention the scrubber and catalyst can be in any order or the scrubber can be absent.

Nitrogen oxides present in the off-gas can be reduced by reaction with CO and VOCs as these compounds will consume each other. However, in an excess of oxygen the CO and VOCs will tend to react with the oxygen. Thus, dose control of oxygen levels can allow removal of nitrogen oxides by reaction with CO and VOCs.

The reduction catalyst may be provided by a 3-way catalytic converter of the type known for use in the automobile industry, for example as are widely available from various suppliers, such as those from Wuxi Honghu Muffler Co., Ltd. and Beihai Huihuang Chemical Ceramic Co. Ltd, both China, which generally have working temperatures in the range 400-800° C. An example of a catalyst used to date in the method is the 3 way catalyst EC1000 from EEC, having a ceramic substrate 400 cpsi, 93 mm×152 mm, with an alumina/zirconium/ceria wash coat of PGM Palladium: Rhodium of 5:1.

In typical operation of the invention, solid emissions in the form of ash are flushed from the chamber e.g. with water. Gaseous emissions, referred to as off-gas, are treated separately and leave the chamber via an off-gas outlet, optionally located at the top of the chamber and flow first into a diesel particulate filter (DPF) catalyst. These filters operate at around 700° C., removing tar through catalytic oxidation as well as a fraction of CO and VOCs. Following the DPFs is a second oxidation catalytic bed, operating at around 500° C. This catalytic bed removes VOC's, CO, hydrogen and remaining tars by converting them into carbon dioxide and water vapour and will also remove nitrous oxides, converting them into nitrogen and oxygen. From the second catalytic bed the remaining gases pass into a water scrubber operating at around 70° C. which absorbs water soluble gases such as HCl and HF as well as any solid particulate matter. The gases exiting the top of the water scrubber consist then essentially of air, water vapour, and carbon dioxide and are regarded as non-toxic.

A pyrolysis and combustion apparatus for carrying out the invention comprises a sealable chamber, a waste treatment zone in the chamber, a port for introducing waste into the chamber, a port for the exit of treated waste, a heating element, an exit for off-gas and an oxidation catalyst through which the off-gas passes after exiting the chamber.

As described below in more detail, apparatus of the invention comprises a single chamber adapted for pyrolysis and combustion of waste in that same chamber. Control apparatus is set up such that input of oxygen is sufficient for combustion (gasification) but insufficient to allow ignition of the waste. As a result combustion proceeds without ignition and without a flame in the chamber or elsewhere in the apparatus.

A process for waste treatment in accordance with the invention comprises introducing waste into a chamber, heating the waste to an elevated temperature to effect pyrolysis of the waste, introducing oxygen into the chamber to effect combustion of the waste, passing off-gas through one or more oxidation catalysts and flushing residue of the combusted waste from the chamber, optionally with water. The elevated temperature to effect pyrolysis is suitably from 400-700° C. Operating at these temperatures with rapid cooling of the chamber and its contents once treatment is finished and using a relatively short treatment cycle time tends to avoid formation of some of the more noxious contaminants (e.g. dioxins and furan) associated with standard pyrolysis or incineration units or form them to a lesser degree, whilst ensuring that substantially all waste, other than recyclable components, can be treated. In particular generation of NO can be reduced in comparison with known incineration methods. Hence an advantage of the invention is that catalytic treatment of off gases can be carried out effectively. The pyrolysis temperature is preferably from 500-700° C., more preferably from 500-600° C. In a specific embodiment of the process, described in more detail below, the system operates at about 550° C.

Combustion is suitably carried out at elevated temperatures, typically 400° C. or higher, preferably at least 450° C. more preferably at least 500° C. In typical operation of an apparatus of the invention, the chamber is heated to the pyrolysis temperature and then combustion is carried out as the next step without specific separate heating or cooling of the chamber. Heat generated by combustion generally maintains an elevated temperature within the waste and depending upon its calorific content may slightly increase the temperature so chamber heaters are generally turned off during combustion. Heat can be removed from the chamber by passing off gases through a radiator or a heat exchanger and recovered heat can be used for other purposes. Chamber temperature can also be controlled by controlling flow of air into the chamber. Generally chamber temperature during combustion does not rise above 800° C. and preferably not above 750° C. or 700° C.

The chamber volume for the apparatus is generally in the range from 0.01-0.50 m$^3$. The chamber volume is preferably in the range from 0.02-0.30 m$^3$, more preferably from 0.03-0.20 m$^3$ or from 0.04-0.10 m$^3$. Chambers with volumes of about 0.06 m$^3$ and about 0.14 m$^3$ have been successfully tested to date. The process and apparatus are suitable treating for waste streams at up to 10 tonnes per day.

In use of a specific embodiment of the invention, gaseous emissions may initially pass into a diesel particulate filter (the DPF) which operates by catalytic conversion in the presence of air to provide an oxidizing environment. The DPF suitably operates at from 500-900° C., preferably 600-800° C., more preferably 650-750° C., and removes tar from the off-gas. It is generally brought to its operating temperature at the start of the process by one or more external, heaters.

In use, the oxidation is exothermic and the temperature may be self-sustaining, and may be controlled by increasing and decreasing the flow of off-gases and air through the DPF. From the DPF the gases may pass into a second catalyst, the HT, operating at 300-700° C., preferably 400-600° C., more preferably 450-550° C. to provide an oxidizing environment in the presence of air to remove VOCs from the off-gas. Air may be injected into the catalytic bed and one or more heaters within the catalyst may bring it to temperature as the first off-gases reach it. Again the reaction within the bed is exothermic so the heaters can be are turned off once the temperature is self sustaining. Temperature can be controlled by controlling the air and off-gas flow. From the HT the gases pass into a water scrubber which removes all the water soluble gases and any remaining particulates and cools the gases.

Advantages of the invention include its efficient reduction in hydrocarbon and CO levels in the off-gas, thus enabling use of the waste processing method and apparatus while remaining within safe emission boundaries. A further advantage of certain embodiments lies in the combination of catalysts to remove different gas contaminants and the combination of catalysts so that upstream heat tolerant catalysts enable removal of difficult to remove VOCs in a downstream catalyst.

The invention is now illustrated with reference to the accompanying figures in which:—

EXAMPLES

Apparatus not specifically described is as described previously in the International patent application published as WO2007/104954, also referred to herein as the PyroPure® apparatus, the contents of which are incorporated herein by reference.

Figure 1:
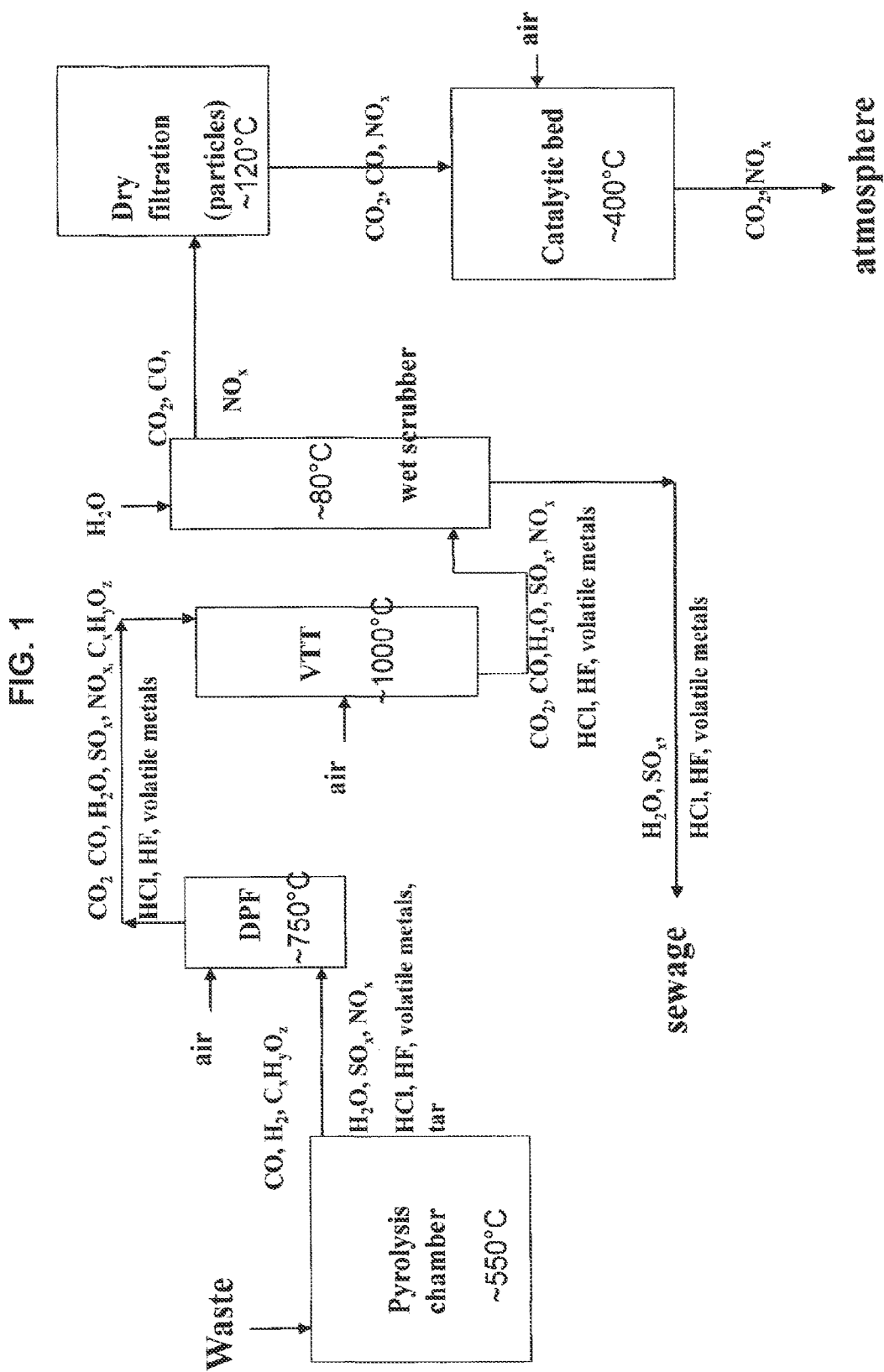
FIG. 1 shows a schematic flow-diagram of a first embodiment of the invention using an oxidation catalyst.

Referring to FIG. 1, the PyroPure® chamber operates at temperatures from 0° C. up to about 600° C., generally at about 550° C. and the off-gases pass into a diesel particulate filter, DPF. This operates at about 550° C.-850° C., generally at about 750° C. and removes tar from the gas. Air is input at that stage to enable catalytic oxidation to take place, control of air flow controlling the catalyst temperature.

The output of the DPF is passed to a VTT unit, a VOC thermal treatment unit which operates at about 1000° C. This destroys $H_2$, volatile organic compounds and heavy tars, however, it can produce some thermal $NO_X$. Thus, it produces an output which may have to be dealt with subsequently, though $NO_X$ remains in general below acceptable limits in which case no specific treatment is needed. From the VTT the gases pass to a wet scrubber operating at about 80° C. in which the gas exits below the water level and passes up through a water mist. This removes remaining tar (if any) and soluble gases such as $SO_2$ and Next, the gas passes through a dry filtration unit, a mist eliminator operating at above 120° C. to prevent condensation, which prevents carry over of water vapour into subsequent processing stages. The gases now pass through a ceramic filter which operates at about 200° C. and eliminates remaining particulates. This filter is omitted if the eventual output passes into the sewer water, as the sewer water will also remove particulates, and is therefore not shown in FIG. 1.

The water scrubber contains approximately 40 liters of water and is a closed unit, the water continuously circulating through it during the cycle time. At the end of the cycle the water is flushed out into the sewer. The pH of the water in the scrubber should be in the region of 6-7, i.e. neutral, and with the majority of waste loads this will be maintained. However it is possible that with a load with a high PVC content the pH value will drop and the water will become too acidic. The pH value is measured during the process and if it begins to drop more water is added. Fresh water can also be continuously added whilst waste water is removed.

The next stage is a so-called auto cat, meaning a conventional 2-way catalytic converter of the type available in the automobile industry. Heated air is input at this stage and the catalytic converter typically operates at about 400° C. This removes CO together with some VOCs.

Finally, the treated gas passes through a carbon filter (not shown in FIG. 1) operating at less than 100° C., the gas finally exiting at temperatures below 50° C. in accordance with the existing legislation.

The output contains contaminants at levels which are acceptable according to the current environmental legislation. This enables the output to go into the atmosphere and/or into the sewer so that the equipment can operate in situ.

Figure 2:
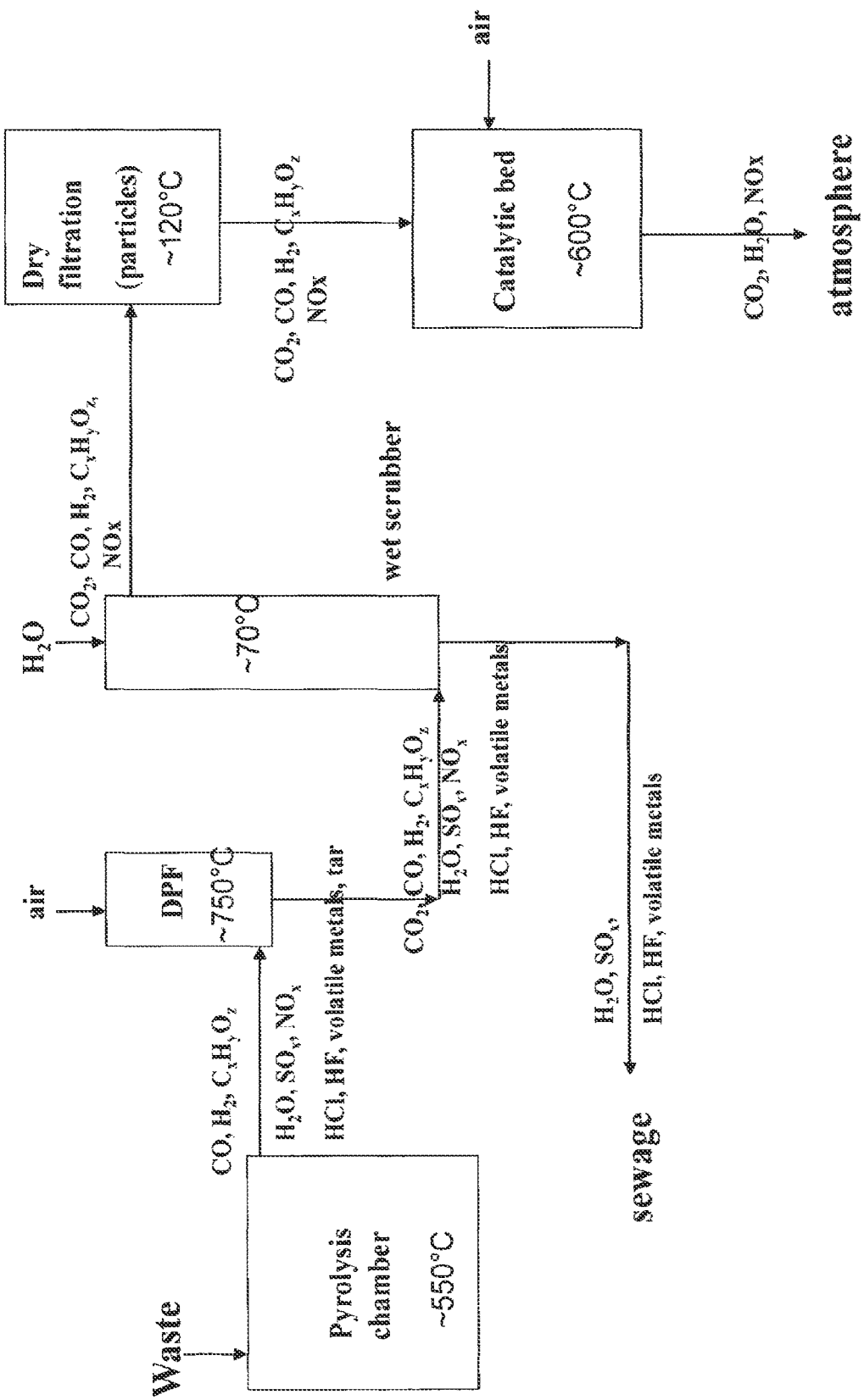
FIG. 2 shows a schematic flow-diagram of a second embodiment of the invention using an oxidation catalyst.

FIG. 2 shows an adaptation of the FIG. 1 embodiment, in which the VTT is dispensed with. This means there are fewer $NO_X$ contaminants as none are generated by the VTT of the FIG. 1 embodiment.

The DPF removes tar and a fraction of VOCs and CO via catalytic oxidation. The wet scrubber, operating at about 70° C., removes inorganic acids and volatile metals and the dry filtration removes particulates not caught by the wet scrubber. The final catalytic bed is an HT catalyst, capable in particular of removing VOCs such as methane and ethane from the off-gas (removed in the FIG. 1 embodiment by the VTT) and operates at about 600° C. and removes VOCs, CO and hydrogen.

This embodiment relies on minimizing nitrous oxide formation thus avoiding the need for a reduction catalyst.

Figure 3:
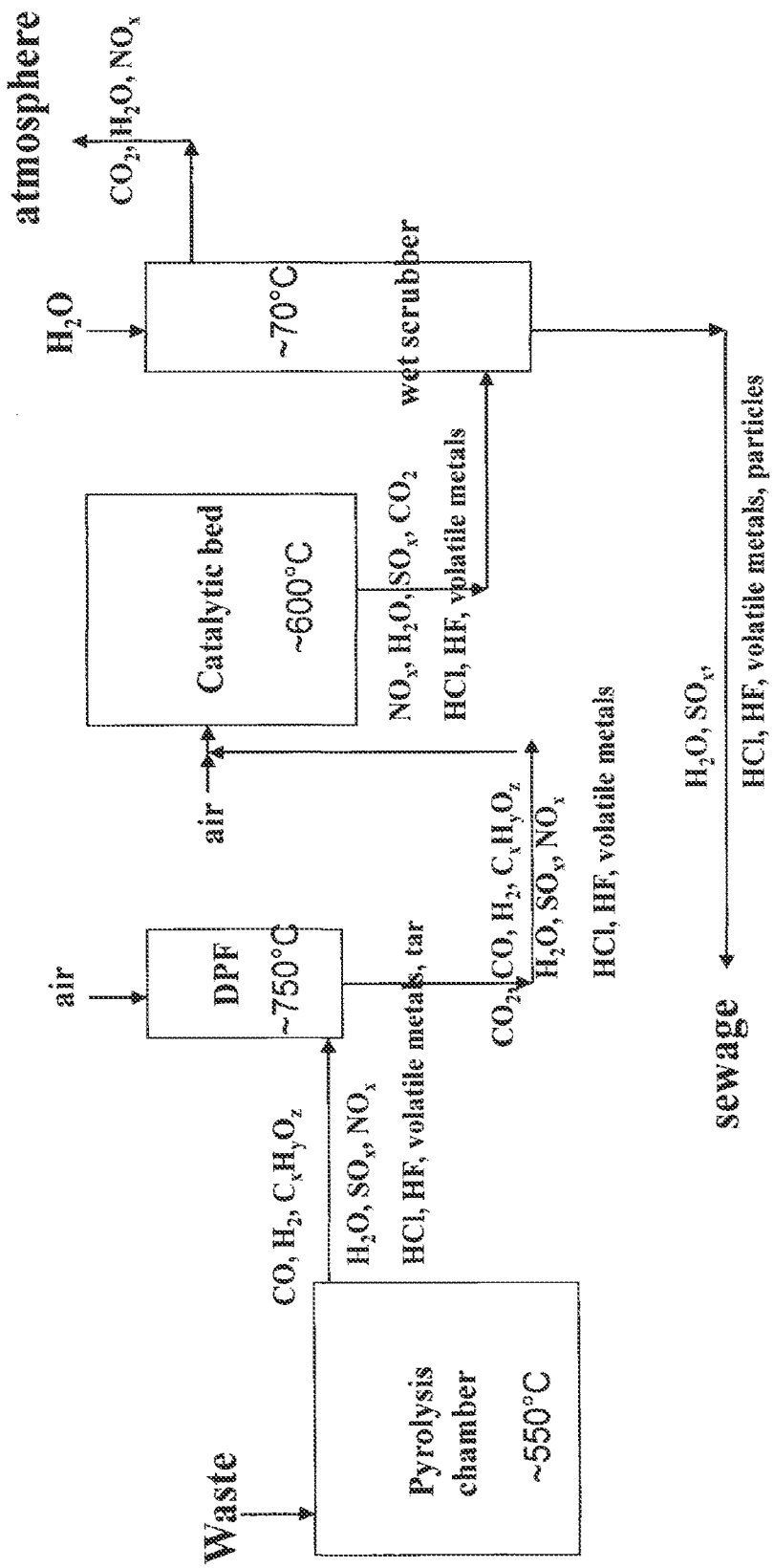
FIG. 3 shows a schematic flow-diagram of a third embodiment of the invention using an oxidation catalyst.

FIG. 3 shows an adaptation of the FIG. 2 embodiment, in which the wet scrubber is positioned after the second catalytic bed.

As with FIG. 1, the DPF removes tar and a fraction of VOCs and CO via catalytic oxidation. Off-gas then passes into the second catalytic bed, an HT catalyst; into which air, optionally heated air is input and operating at about 600° C. This completes oxidation of CO and VOCs and hydrogen to carbon dioxide and water.

Gases then pass to the wet scrubber, operating at about 70° C., which removes inorganic acids, volatile metals and particulates, the latter with such efficiency that a separate dry filtration is not needed. After the water scrubber the cleaned and filtered air with an oxygen content generally from 10%-21% is vented into the sewer pipe.

Figure 4:
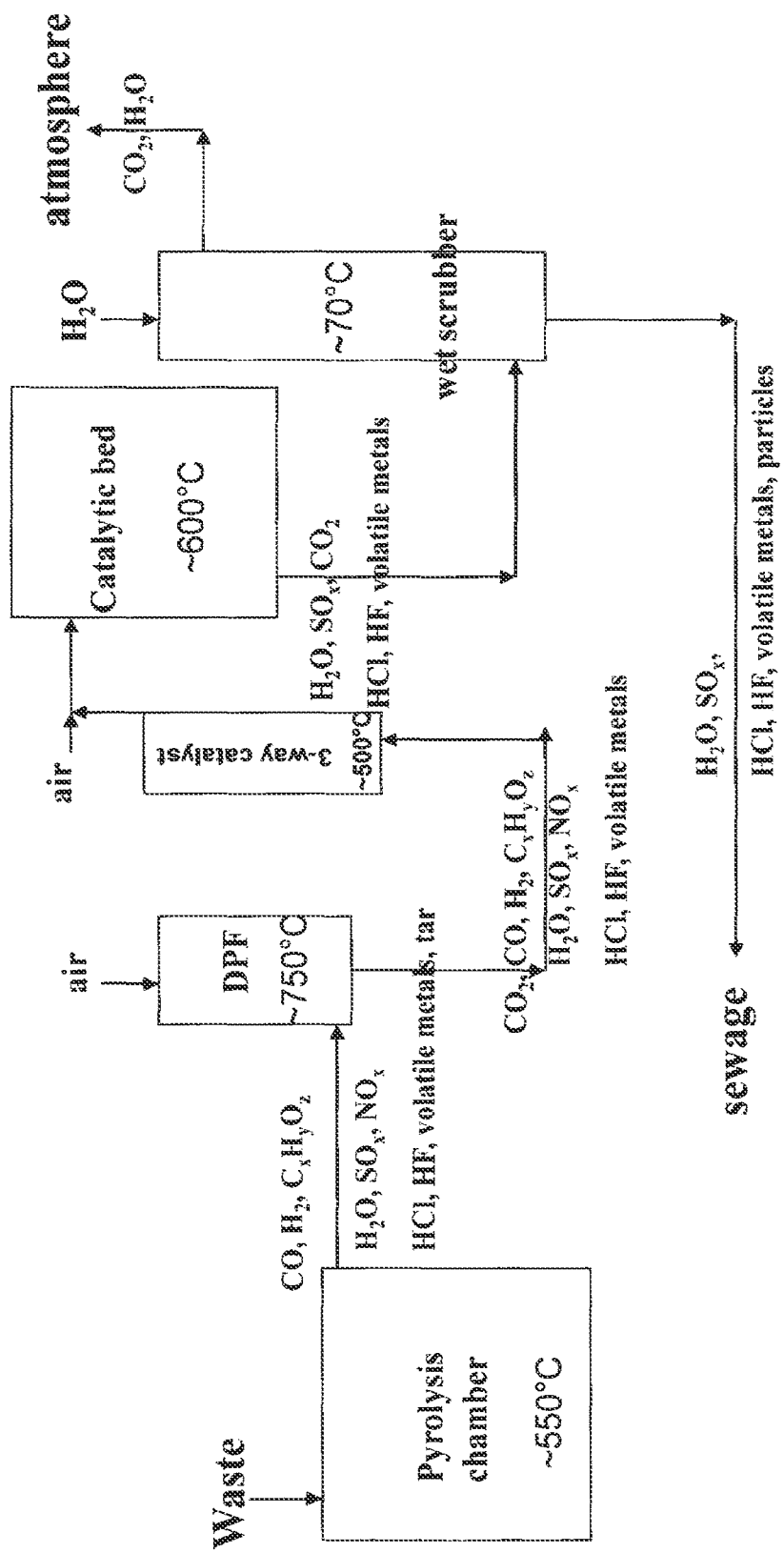
FIG. 4 shows a schematic flow-diagram of a fourth embodiment of the invention using an oxidation catalyst and a reduction catalyst.

A further embodiment of the invention is shown at FIG. 4. As for the other embodiments, off-gas passes first through a DPF oxidation catalyst. From here the gases pass through a 3-way catalytic converter, which can act as reduction catalyst to reduce nitrous oxides and then into the catalytic bed of an HT oxidation catalyst, with input of air, where oxidation of VOCs and CO is completed. Lastly, the gases pass through the wet scrubber. After the water scrubber the cleaned and filtered air with an oxygen content generally from 10%-21% is vented into the sewer pipe.

Figure 5:
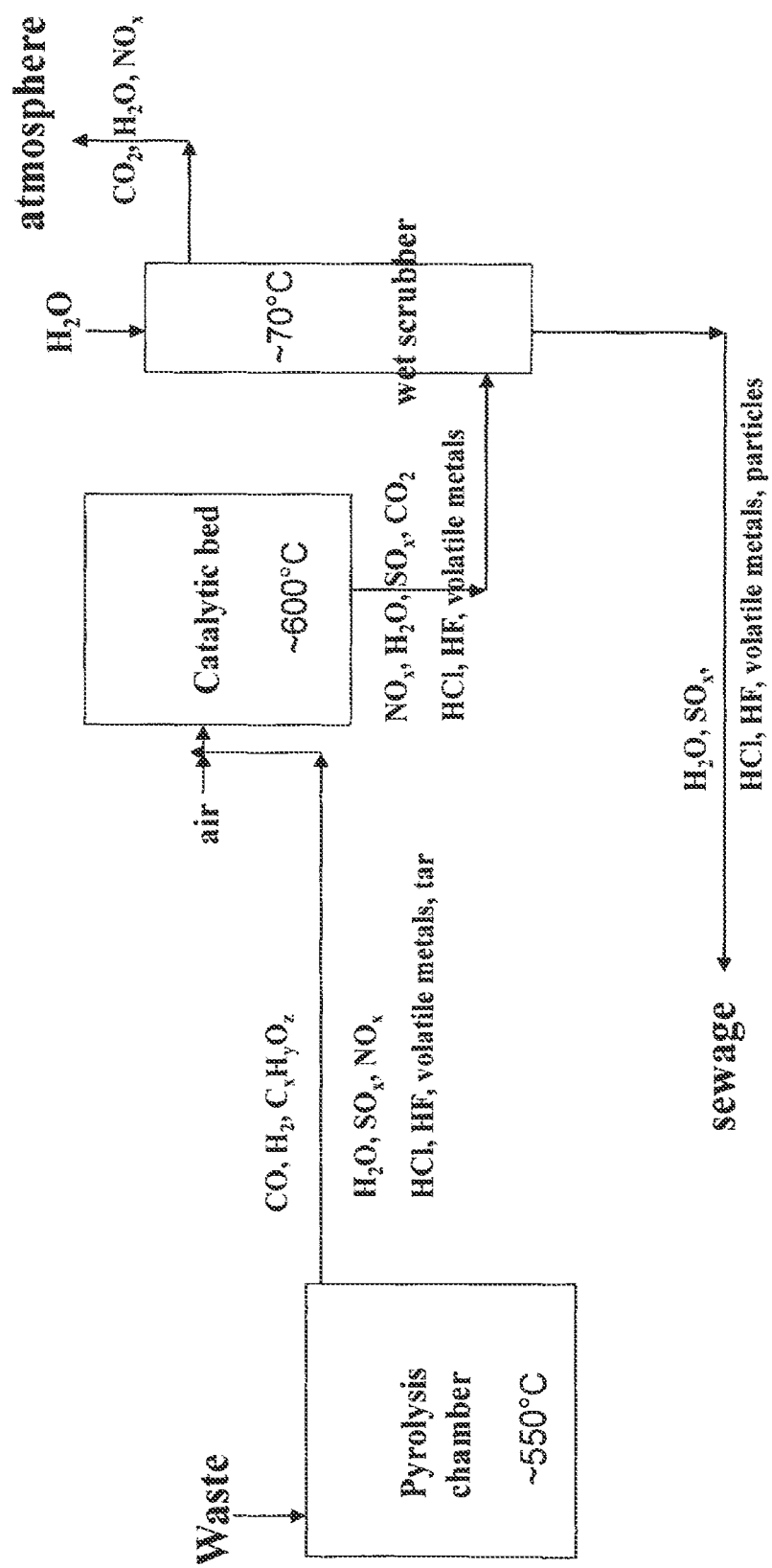
FIG. 5 shows a schematic flow-diagram of a fifth embodiment of the invention using a single oxidation catalyst.

A still further embodiment of the invention is shown at FIG. 5. Off-gas exiting the chamber passes through a metal mesh filter (not shown) to remove ash and then does not pass through a DPF as in other embodiments but through a catalytic bed of an HT catalyst where, with input of air, oxidation of tar, VOCs and CO is carried out. Lastly, the gases pass through the wet scrubber. After the water scrubber the cleaned and filtered air with an oxygen content from 10%-21% is vented into the sewer pipe.

Figure 6:
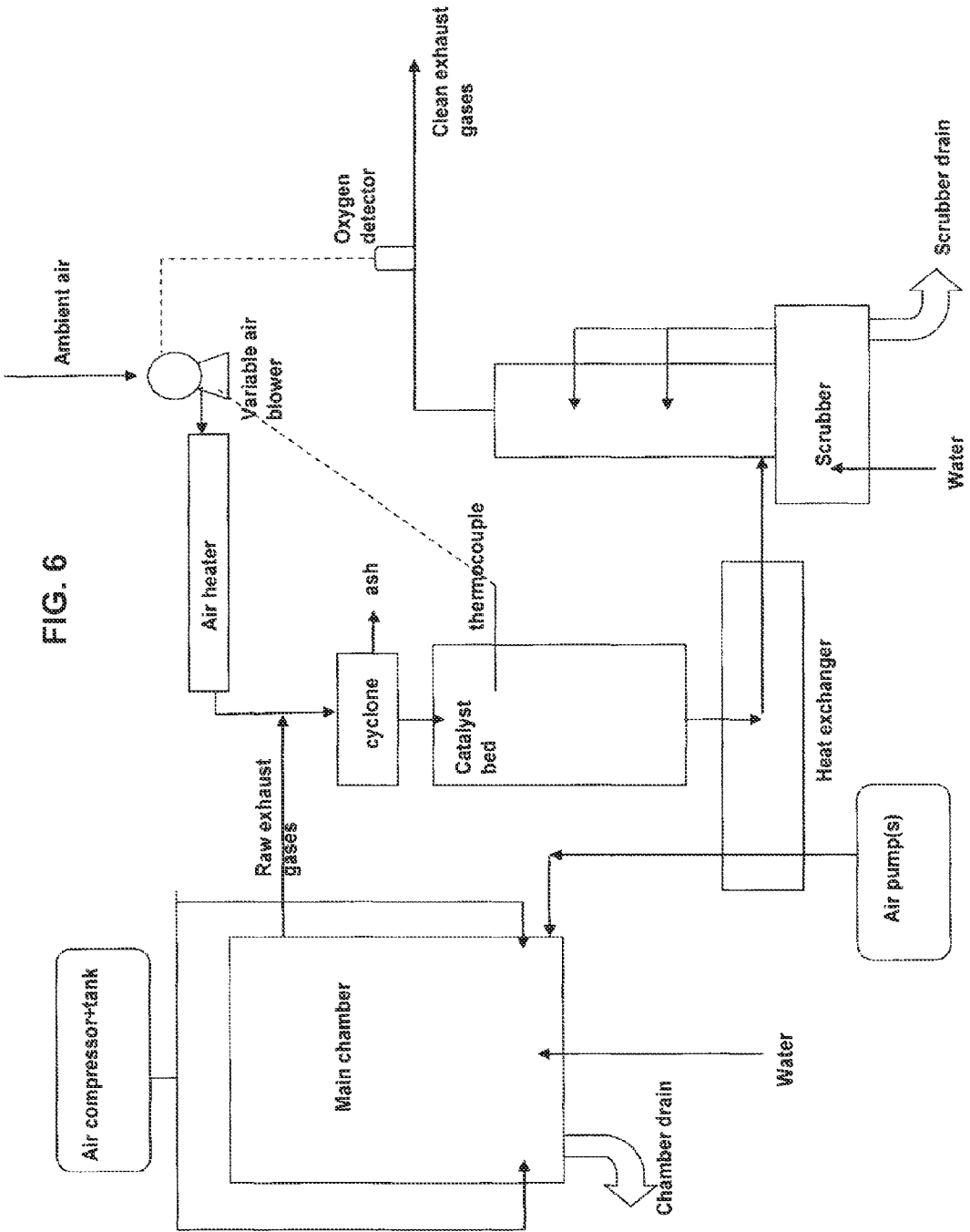
FIG. 6 shows a schematic flow-diagram of a sixth embodiment of the invention using a single catalyst in combination with a heat exchanger and feedback control of oxygen levels and catalyst temperature.

A preferred embodiment of the invention is shown at FIG. 6. Pyrolysis, combustion (gasification) and off-gas treatment are substantially as per previous examples, unless otherwise stated. Raw exhaust gases exiting the chamber first pass through a cyclone to remove ash from the off-gas prior to contact of off-gas with a catalyst. In this apparatus the catalyst is a palladium/alumina oxidation catalyst having a single catalyst bed. Exiting the cyclone, off-gases then pass through the catalyst bed and a thermocouple associated with the catalyst provides temperature feedback information to a variable air blower. The air blower controls the amount of air to be mixed with the exhaust gases and this air is first passed though a heater to modulate its temperature. Exhaust gases exiting the catalyst bed pass through a heat exchanger en route to the gas scrubber. The heat exchanger transfers heat from the catalyst bed exhaust onto air injected into the chamber that is used during the pyrolysis and oxidation stages. Cooled exhaust gases exiting the heat exchanger pass through the gas scrubber for removal of $SO_2$, acids, particulates and volatile metals and are cooled still further by the water in the scrubber. Clean exhaust gases exiting the scrubber pass via an oxygen detector which monitors the oxygen content in the exhaust gas and provides feedback information to the variable air blower in order to further modulate the amount of air being mixed with the exhaust gases input to the oxidation catalyst.

In one operation of the apparatus, about 8 kg of typical household waste is placed in the chamber, which is heated to about 550° C. for pyrolysis with an airflow of about 16 L/min introduced from the start. The pyrolysis stage lasts for about 40 minutes after which air flow into the chamber is increased gradually up to about 150 L/min, starting the oxidation stage. When the pyrolysis stage begins the catalyst bed is heated to about 600° C. by heated air being supplied from the variable air blower at a rate of about 200 L/min. The air flow is increased up to about 800 L/min during the run as required. The rate of air flow is controlled by the thermocouple maintaining the temperature of the catalyst within its operating temperature and the oxygen content of the final exhaust gas as measured by the oxygen detector. The oxygen content of the final exhaust gas is controlled within the 3-10% range.

The invention thus provides waste treatment method and apparatus.

The invention claimed is:

1. A method for treatment of a waste, comprising:
   heating the waste in a chamber to an elevated temperature to effect pyrolysis of the waste;
   introducing compressed air from a tank into the chamber following pyrolysis to effect gasification of the pyrolyzed waste such that pyrolysis and gasification are carried out in sequence in the same chamber, wherein an off-gas is produced;
   contacting off-gas from the pyrolysis and/or gasification steps with a 3-way catalyst external to the chamber to convert carbon monoxide and hydrocarbons in the off-gas into carbon dioxide and water;
   measuring the oxygen content of an exhaust gas from the oxidation catalyst using an oxygen sensor, and using this information to modulate an air input to the catalyst or to the chamber or to both the catalyst and the chamber so as to maintain the oxygen level of a gas exiting a waste treatment apparatus comprising the chamber and the catalyst; and
   monitoring the catalyst temperature using a temperature sensor in or near the catalyst so that an increase in temperature triggers an increase in the air input to the catalyst to reduce the temperature.

2. The method according to claim 1, wherein the elevated temperature to effect pyrolysis is from 400-700° C.

3. The method according to claim 1, wherein the oxygen level of the gas exiting the waste treatment apparatus is maintained within the 1-16% range.

4. The method according to claim 1, wherein the oxygen level of the gas exiting the waste treatment apparatus is maintained within the 3-10% range.

5. The method according to claim 1, wherein the catalyst comprises platinum, palladium or rhodium.

6. The method according to claim 1, wherein an increase in the catalyst temperature above about 600° triggers an increase in the air input to the catalyst.

7. The method according to claim 1, further comprising contacting the off-gas with a reduction catalyst to convert nitrous oxides into nitrogen and oxygen.

8. The method according to claim 7, wherein the reduction catalyst comprises platinum, palladium or rhodium.

9. The method according to claim 1, further comprising contacting the off-gas with a wet scrubber to remove inorganic acids and volatile metals.

10. The method according to claim 7, further comprising filtering the off-gas to remove ash prior to the contact of the off-gas with the 3-way and/or reduction catalysts.

11. The method according to claim 10, comprising contacting the off-gas with a cyclone to remove ash prior to the contact of the off-gas with the 3-way and/or reduction catalysts.

12. The method according to claim 1, further comprising passing the exhaust gas from the 3-way catalyst through a heat exchanger.

13. The method according to claim 1, wherein the oxygen level of the gas exiting the waste treatment apparatus is at least 4%.

14. The method according to claim 1, wherein operations of the method are performed by the waste treatment apparatus, the waste treatment apparatus further comprising
   a heater to heat the waste in the chamber;
   an inlet for compressed air from a tank to enable gasification of the waste in the chamber following pyrolysis;
   an outlet for exit of the off-gas from the chamber;
   3-way catalyst to treat the off-gas from the chamber wherein the catalyst is external to the chamber;
   an oxygen monitor to monitor the oxygen content of an exhaust gas from the catalyst;
   an air input to combine air with the off-gas prior to contact with the catalyst, wherein the input of air into the off-gas prior to contact with the catalyst is controlled by the oxygen monitor; and
   the temperature sensor, wherein the temperature sensor is connected to the air input such that the input of air can be controlled to modulate the operating temperature of the catalyst;
   wherein the chamber is configured to receive the waste; and
   wherein the apparatus is adapted to be sealed so that the waste can be heated to effect pyrolysis of the waste.

15. The method according to claim 14, wherein the waste treatment apparatus is configured to effect the pyrolysis of the waste at a temperature from 400-700° C.

16. The method according to claim 14, wherein the oxygen content of the offgas after the contact with the catalyst is within the range of 1-16%.

17. The method according to claim 16, wherein the oxygen content of the offgas after the contact with the catalyst is within the range of 3-10%.

18. The method according to claim 16, wherein the oxygen content of the offgas after the contact with the catalyst is at least 4%.

19. The method according to claim 14, wherein the waste treatment apparatus further comprises a reduction catalyst to catalyse reduction of nitrous oxides in the off-gas.

20. The method according to claim 14, wherein the waste treatment apparatus further comprises an ash filter between the chamber and the 3-way and/or reduction catalyst to prevent ash in the off-gas reaching the 3-way and/or reduction catalysts.

21. The method according to claim 14, wherein the waste treatment apparatus further comprises a cyclone to prevent ash entering the 3-way and/or reduction catalyst.

22. The method according to claim 14, wherein the waste treatment apparatus further comprises a heat exchanger to process the exhaust gas exiting the catalyst and the air entering the chamber.

23. A method for treatment of a waste, comprising:
   heating the waste in a chamber to an elevated temperature to effect pyrolysis of the waste;
   introducing compressed air from a tank into the chamber following pyrolysis to effect gasification of the pyrolyzed waste such that pyrolysis and gasification are carried out in sequence in the same chamber, wherein an off-gas is produced;

contacting off-gas from the pyrolysis and/or gasification steps with a 3-way catalyst external to the chamber to convert carbon monoxide and hydrocarbons in the off-gas into carbon dioxide and water;

measuring the oxygen content of an exhaust gas from the catalyst using an oxygen sensor, and using this information to modulate an air input to the catalyst or to the chamber or to both the catalyst and the chamber so as to maintain the oxygen level of a gas exiting a waste treatment apparatus comprising the chamber and the catalyst, wherein the oxygen level of the gas exiting the waste treatment apparatus is at least 4%; and monitoring the catalyst temperature using a temperature sensor in or near the catalyst so that an increase in temperature triggers an increase in the air input to the catalyst to reduce the temperature.

* * * * *